Aug. 15, 1933.　　　A. M. JOHNSON　　　1,922,246
MACHINE TOOL
Filed April 23, 1930　　　5 Sheets-Sheet 4

Inventor
Albert M. Johnson

Aug. 15, 1933.　　　A. M. JOHNSON　　　1,922,246
MACHINE TOOL
Filed April 23, 1930　　5 Sheets-Sheet 5
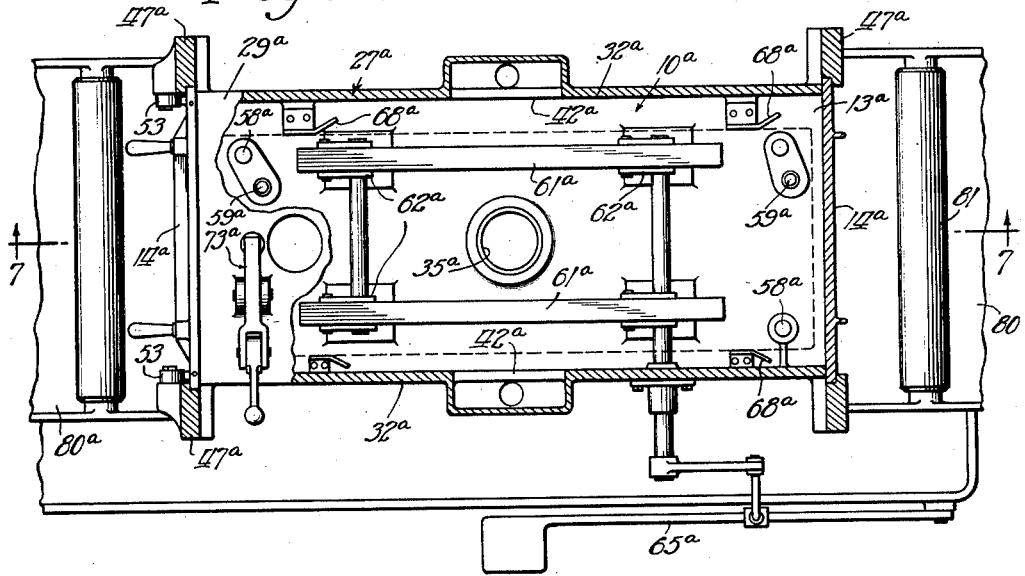
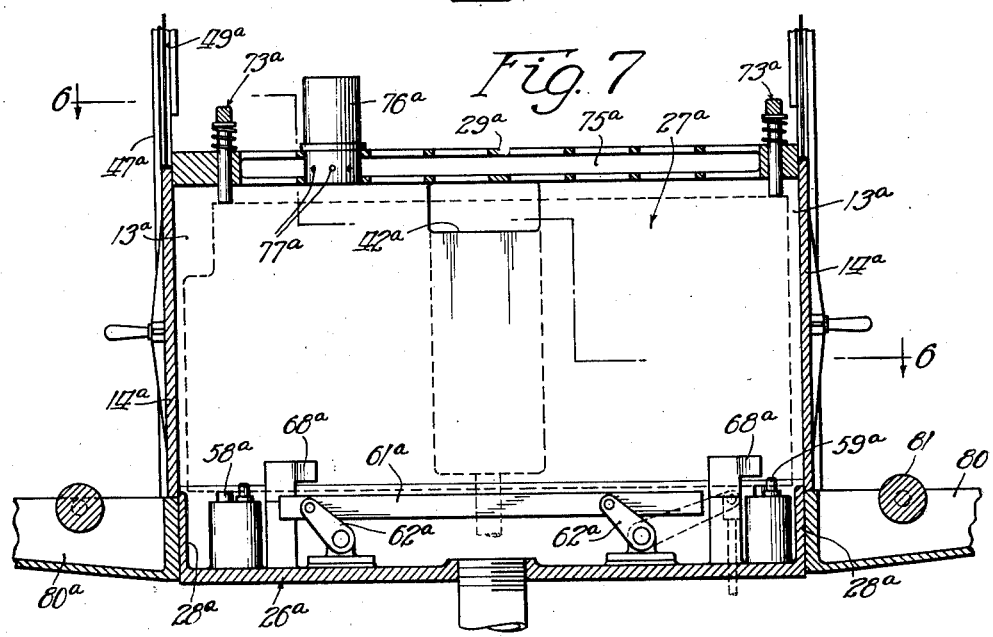
Inventor
Albert M. Johnson Patented Aug. 15, 1933

1,922,246

UNITED STATES PATENT OFFICE 1,922,246

MACHINE TOOL

Albert M. Johnson, Rockford, Ill., assignor to Barnes Drill Co., Rockford, Ill., a Corporation of Illinois Application April 23, 1930. Serial No. 446,442

14 Claims. (Cl. 51—34)

The invention relates generally to an improved construction for machine tools permitting the application of liquid coolant during the operation of the working tool in sufficient quantities to avoid damage to the tool and to the work. More particularly, the invention concerns machine tools of the honing machine type and is accordingly herein set forth as applied to such a machine.

The honing operation is usually intended to produce, not only a smooth surface, but also to produce a surface which bears a definite relation to some other surface or part of the work. This is true in the honing of the cylinders of an engine block, since the satisfactory operation of the engine is dependent to a large extent upon the relative diameters of the cylinders and the pistons. During the performance of the honing operation, the engine block expands due to the heat generated by the honing operation and in case a high degree of accuracy is necessary, this expansion may be large enough to cause undesirable variations in the diameter of the finished cylinder.

The primary object of the present invention is to provide a new and improved means for cooling successively presented pieces of work during each working operation, whereby the heat resulting from the operation is effectually conducted from the work.

Another object is to provide in a machine of the character indicated novel means for inclosing the work while it is mounted on the machine so that the work may be substantially submerged in liquid coolant during the honing operation.

Another object is to provide in combination with the work support of a machine tool a chamber in which heavy pieces of work such as cylinder-blocks may be substantially enclosed, arranged to permit convenient insertion and removal of the work.

Another object is to provide a machine having such a submerging chamber in which one side wall may be removed so that the work may be moved transversely into and out of the chamber.

Another object is to provide a machine embodying new and improved means for properly locating the work in its operative position on the machine.

Other objects and advantages will become apparent from the following description taken in connection with the accompanying drawings in which:

Fig. 6 is a plan view, taken partially in section along the line 6—6 of Fig. 7, showing an alternative embodiment of the invention.

Fig. 7 is a vertical sectional view taken along the line 7—7 of Fig. 6.

Figure 1:
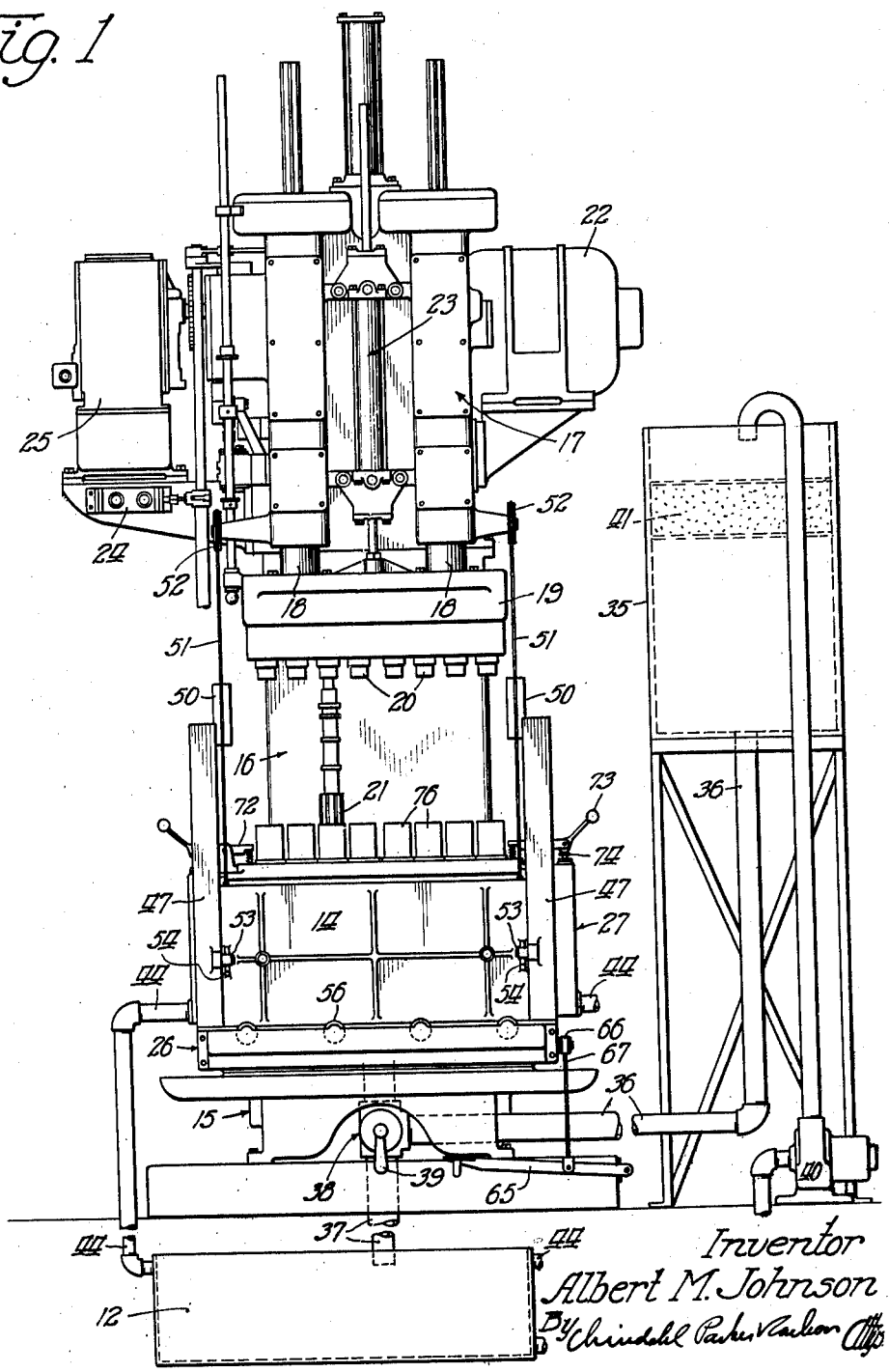
Figure 1 is a front elevational view of a honing machine embodying the invention in its preferred form.

In order to give a complete understanding of the principles of the invention, a particular form of honing machine is herein illustrated and described, but it is to be understood that this disclosure is not intended as a limitation of the invention to this type of machine tool, it being contemplated that various changes might be made by those skilled in the art to adapt the invention to other types of tools without departing from the spirit and scope of the invention as defined by the appended claims.

The invention is particularly applicable to honing machines of the type disclosed and claimed in my copending application, Serial No. 152,560, filed December 4, 1926, now Patent No. 1,783,019, wherein one or more rapidly rotated honing tools are mounted for vertical reciprocation relative to a piece of work such as the cylinder-block of an internal combustion engine; and in the embodiment of the invention herein illustrated, I provide a chamber 10 formed about the work support so as to inclose the work 11 (Fig. 2) therein. Into this chamber I supply a suitable liquid coolant in a sufficient quantity to substantially submerge the article to be honed, so that the heat generated during the honing operation may be effectively absorbed by the coolant. After each honing operation the coolant is rapidly withdrawn to a sump 12 and then after the finished work has been replaced by a new piece, another charge of coolant is introduced in the chamber 10 preliminary to the next honing operation. To facilitate the insertion and removal of the work, especially when the latter is large and cumbersome, as in the case of an engine cylinder-block, the chamber 10 is formed so that the work may be moved horizontally into and out of the chamber. In the embodiment shown in Figs. 1 to 5, a single opening 13 in one side of the chamber serves this purpose and is adapted to be closed by a gate 14. When a single opening is used, it is preferably formed at the forward side of the chamber just rearwardly of a loading platform 14ª so that when the gate is in its open position the cylinder-block 11 or other work may be conveniently slid into and out of the chamber.

As shown in Fig. 1 of the drawings, the machine comprises a bed 15 upon which the chamber 10 is mounted and having column 16 extending upwardly behind the chamber 10. At its upper end, the column 16 has a portion 17, Fig. 1, projecting forwardly over the chamber 10. A pair of horizontally spaced vertical sleeves 18 mounted in the portion 17 of the column serve to support and guide a spindle head 19 for vertical reciprocation. In the head 19 a plurality of parallel rotatable spindles 20 are mounted in vertical position to support and actuate a plurality of honing tools 21. The spindles 20 and tools 21 are simultaneously rotated by clutch control means of any well known character, not herein shown, which is driven from a motor 22 mounted on the column. The reciprocatory movement of the honing tools 21 is obtained through reciprocation of the head 19 by means of a piston and cylinder device 23, mounted on the column and connected to the head. The piston and cylinder device 23 receives pressure fluid under the control of a valve 24 from a pump 25 driven by the motor 22.

Figure 2:
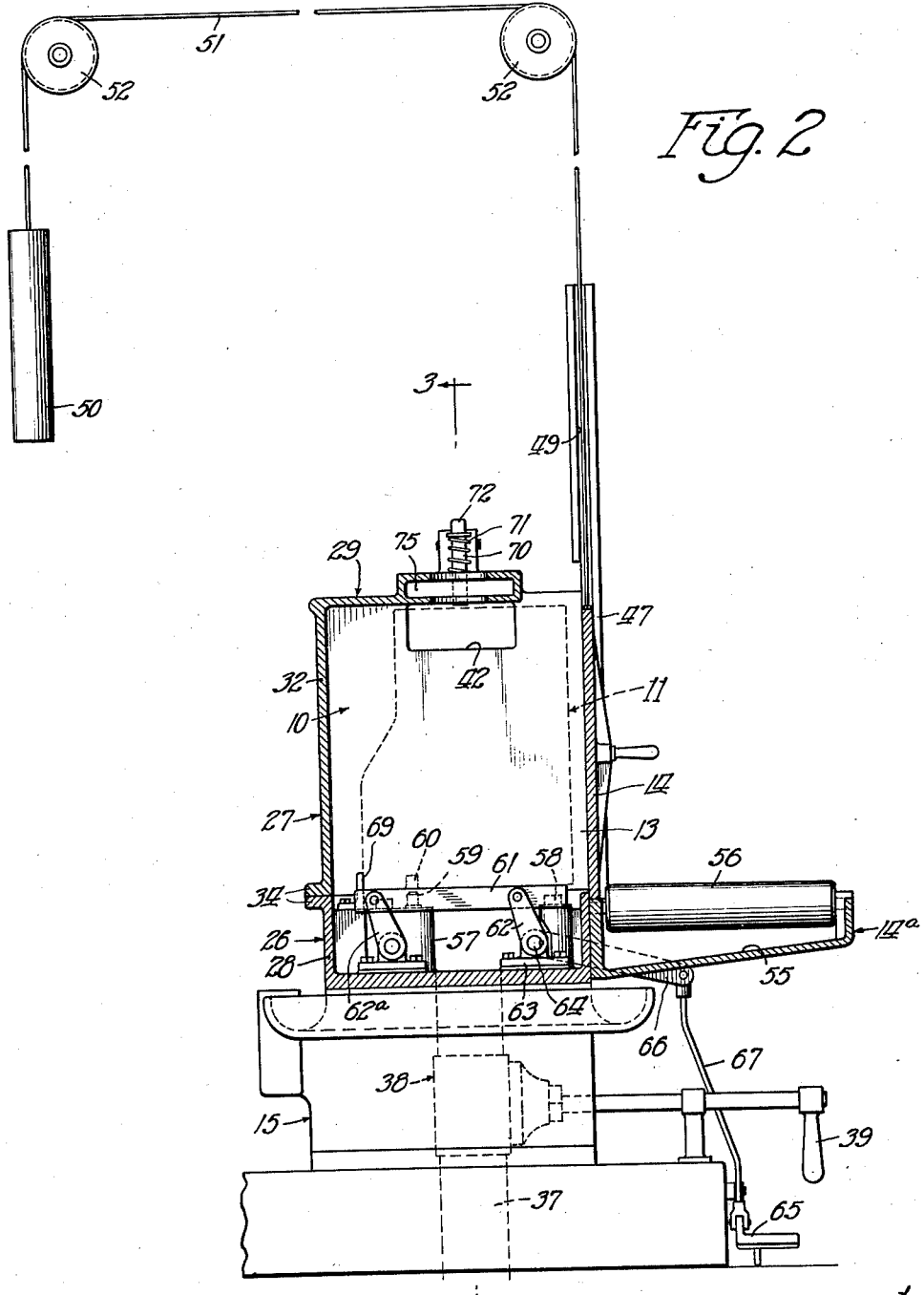
Fig. 2 is an enlarged fragmental section taken along the line 2—2 in Fig. 3.
Figure 3:
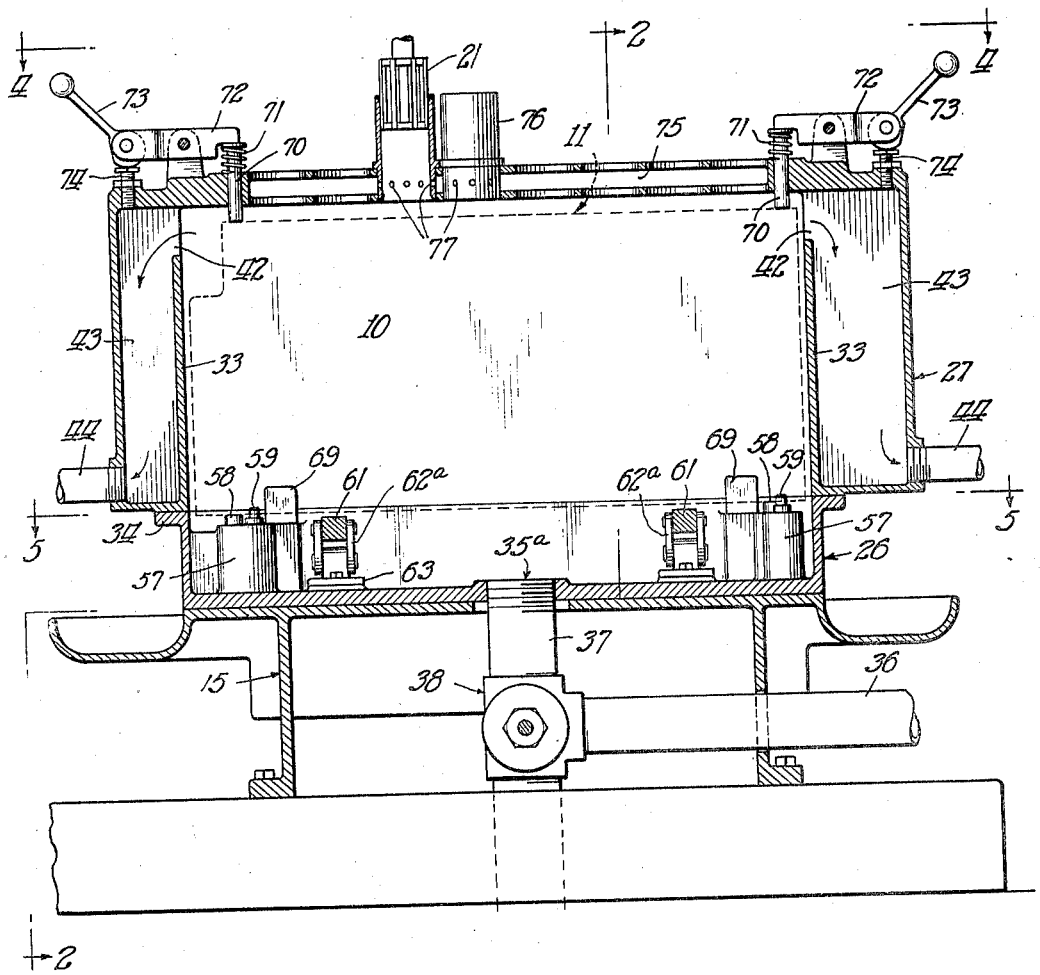
Fig. 3 is a sectional view taken along the line 3—3 in Fig. 2.
Figure 4:
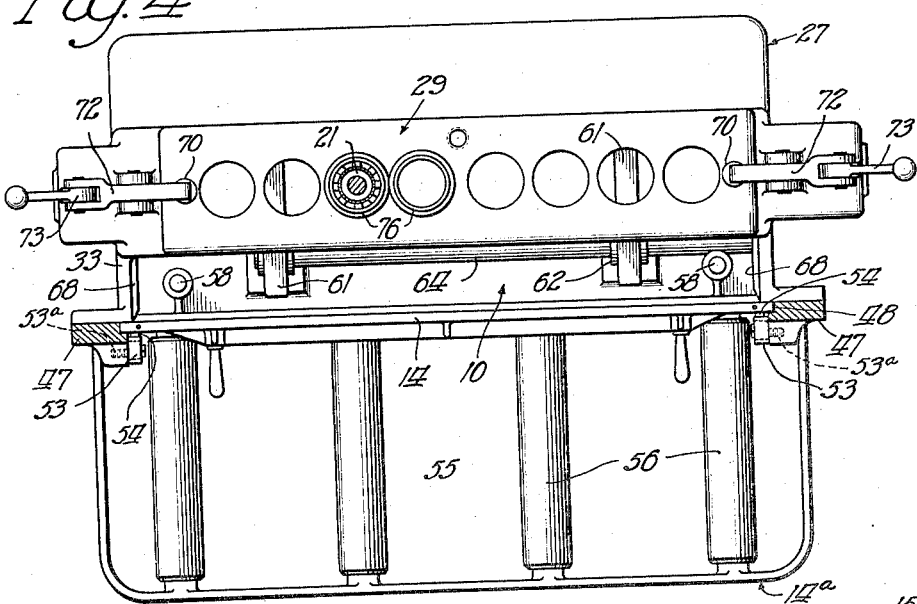
Fig. 4 is a plan view taken along the line 4—4 of Fig. 3.

The chamber 10 is constructed to provide a work support in the bottom thereof, and in the present instance it has a base section 26 which forms a support and an upper enclosing section 27 which has a top wall 29 constructed to provide guides for the honing tools 21. As shown in Figs. 2 and 3, the base section 26 of the chamber 10 is in the form of a flat casting having upstanding side walls 28, while the upper section 27 has rear and end walls 32 and 33, which are braced by the top wall 29 and form upward continuations of the corresponding walls 28 of the base section 26. At their adjacent edges the walls 28, 32 and 33 have flanges 34, Figs. 2 and 3, for securing the upper section 27 in position on the base section.

Liquid coolant may be introduced into the chamber 10 and withdrawn therefrom by suitable means, comprising, in the present instance, a large port 35ª. This port is connected with an elevated tank 35 by means of a pipe 36 for the purpose of supplying the coolant to the chamber 10, and the coolant is withdrawn from the chamber 10 through the same port to a drain pipe 37. A control valve 38 has an operating handle 39 and in one position permits coolant to be introduced into a chamber 10 from the tank 35. In another position the valve retains the coolant in the chamber 10, while in a third position it permits the coolant to be discharged through the drain pipe 37 into the sump 12. From the sump 12 the coolant is elevated to the tank 35 by a pump 40 and is passed through a filter 41 to remove the abrasive and metal therefrom. In the end walls 33 of the chamber 10 near the top thereof, overflow ports 42 are formed which determine the height of the coolant in the chamber and permit the excess coolant to pass into passages 43 and back to the sump 12 through the drain pipes 44.

The work 11 is introduced into the chamber 10 through the opening 13 from the loading platform 14ª which projects forwardly from and is supported by the base section 26 of the chamber 10. The opening 13 is formed between the forward edges of the end walls 33 and the gate 14 slides vertically along the forward edges of the walls 33. By employing a gate 14 so that the work may be slid horizontally into the chamber 10, it is possible to make a chamber of minimum size, just large enough to receive the work, and thus the quantity of coolant which must be used for each honing operation is reduced. It will be understood, of course, that the chamber 10 will contain sufficient coolant to maintain the desired temperature in the work 11.

To hold the gate 14 in position against the edges of the walls 33 and guide it in its vertical movement, a pair of bars 47 are secured on the ends of the walls 33 and are recessed as at 48 so as to overlie the edges of the gate 14. The bars 47 extend above the chamber 10 and have grooves 49 (Fig. 2) therein to guide the gate when it is raised to its open position. Preferably the gate 14 is counterbalanced by weights 50 connected to the gate by cords 51 extending over pulleys 52 fixed on the column 16.

When the gate 14 is in its lower or closed position, as shown in Figs. 1 and 2, its lower edge is positioned in front of and in abutment with the upper part of the forward wall 28, so that the chamber 10 will be substantially liquid tight. In order to insure a perfect seal about the edges of the gate 14, a pair of rollers 53 may be mounted on the bars 47 so as to project over the end edges of the gate 14 in the path of sloping cam surfaces 54 formed on the gate. To permit of adjustment, the rollers 53 are carried by eccentrically mounted pins 53ª (Fig. 4) which may be rotated by suitable means so as to insure firm abutment of the gate with the walls 28 and 33.

As shown in Fig. 2, the platform 14ª has a sloping bottom surface 55 to drain the coolant therefrom and is also provided with a plurality of horizontal rollers 56, arranged so that a cylinder-block 11 may be moved on the rollers transversely of the opening 13 into position in front of the chamber 10. The upper surfaces of the rollers 56 are slightly above the top of the wall 28 so that when the gate 14 is opened a cylinder-block may be slid horizontally off of the rollers into the chamber 10.

The work support within the chamber 10 comprises a plurality of spaced standards 57 cast integrally with the base section 26 and projecting upwardly in the four corners of the chamber 10. At the top of each standard 57 an accurately machined stud 58 is mounted to engage the bottom of the cylinder-block as shown in Fig. 3. In order to locate the block 11 in its proper horizontal position on the supporting studs 58, a pair of upstanding guide pins 59 are mounted on two of the standards 57. The pins 59 extend upwardly beyond the ends of the studs 58 so that they may project into complementary recesses 60 (Fig. 2) formed in the bottom of the block 11.

Figure 5:
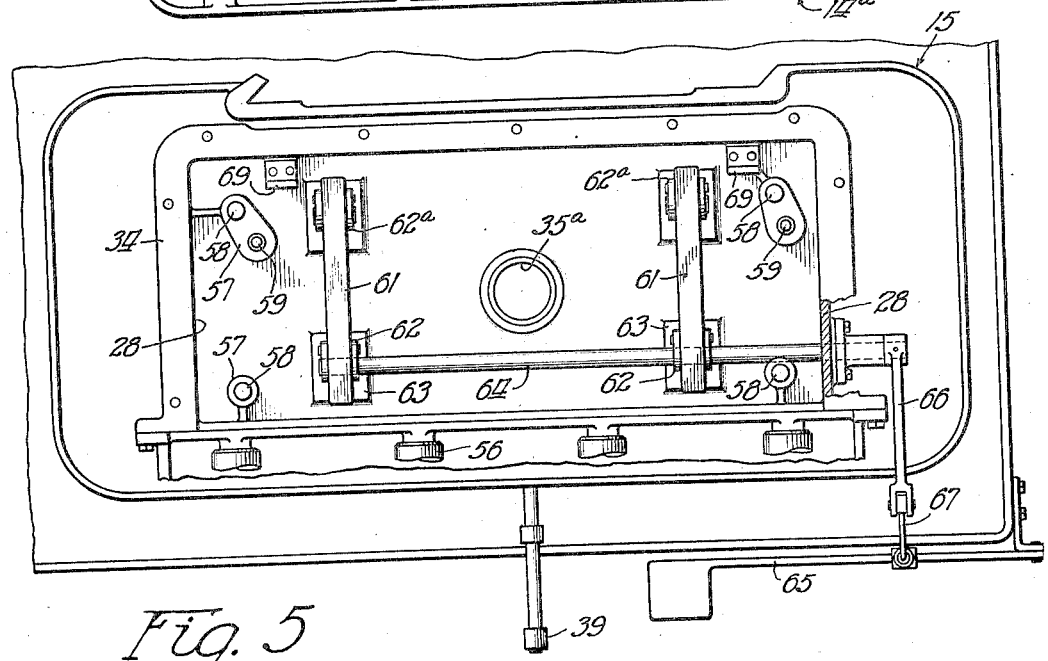
Fig. 5 is a fragmental plan view of the work support taken along the line 5—5 of Fig. 3 with the upper part of the side walls of the submerging chamber removed.

As shown in Figs. 2 and 5, the present machine is provided with means for supporting the work for horizontal movement into a position above the standards 57 and subsequently operable to lower the work into its set position on the studs 58 with the guide pins 59 entered into the recesses 60. In the form shown, this means comprises a pair of horizontal, transversely spaced bars 61 mounted intermediate the supporting studs 58 for simultaneous vertical movement while maintained in horizontal position parallel to the path of movement of the block 11. Such movement of the bars 61 is obtained by mounting each bar on a pair of rocker arms 62, 62ᵃ which are pivoted on brackets 63 in the bottom of the chamber 10. For the purpose of raising and lowering the bars 61, the two arms 62 are secured to a common shaft 64 which extends through one wall of the chamber 10 and is connected to a foot treadle 65 by means of a lever 66 and a link 67. By depressing the treadle 65 from the position shown in Fig. 1 to the position shown in Fig. 2, the bars 61 may be raised to the position shown in Fig. 2, wherein the upper surfaces of the bars are in the same horizontal plane as the upper surfaces of the rollers 56.

It will be apparent that when the bars 61 have been elevated, the motor block 11 may be slid from the rollers 56 through the opening 13 in the chamber so as to be supported by the bars 61. To guide the work in such movement and facilitate the horizontal positioning thereof, a pair of guide plates 68, Fig. 4, may be mounted on the end walls 33 so as to engage the ends of the motor block, and a pair of stops 69, Figs. 2, 3 and 5, may be positioned on the base section 26 so as to be engaged by the rear side of the motor block.

When the motor block has been lowered to its position on the studs 58, it is preferably clamped in position and this is accomplished in the present case by means mounted on the top wall 29 of the chamber 10. As shown in detail in Figs. 2, 3 and 4, this means comprises a pair of headed pins 70 mounted for vertical sliding movement through the top wall 29 into engagement with the top of the motor block 11, as shown in Fig. 3. The clamping pins 70 are normally retracted by springs 71 and may be pressed to their operative positions by levers 72. Each of the levers 72 is pivoted intermediate its ends on the wall 29 with one end overlying the pin 70. At its other end each lever 72 carries an eccentric device 73, arranged to engage an adjustable abutment formed by a bolt 74 screwed into the top wall 29 of the chamber.

The present embodiment of the invention contemplates and provides means for supplying liquid coolant to the upper ends of the cylinders during the honing operation. This is accomplished by forming a chamber 75 (Figs. 2 and 3) in the top wall 29 and supplying liquid coolant to this chamber by suitable means not herein shown. When the honing tools 21 are in their upper or inoperative positions, they are guided in sleeves 76 which project through the chamber 75 in the top wall 29. Within the chamber 75 the sleeves 76 are formed to provide a plurality of apertures 77 through which liquid coolant from the chamber 75 may be discharged onto the tools 21 and into the top of the cylinders.

In the use of the machine, shown in Figs. 1 to 5, a cylinder block 11 is moved transversely onto the platform 14ᵃ and with the gate 14 opened, and the bars 61 elevated by means of the treadle 65, the block 11 is slid rearwardly onto the bars 61. In this movement, the block is positioned roughly by guides 68 and stops 69 and as it is lowered into its set position on the studs 58, the guide pins 59 engage the recesses 60 in the block and position it accurately within the chamber 10. The gate 14 is then lowered to engage the cam surfaces 54 with the rollers 53 to seal the sides of the chamber so that it will hold the charge of liquid coolant which is admitted through the port 35ᵃ under the control of the valve 38. As the chamber is being filled with coolant, the work is secured in position by the clamps 73 and as soon as the filling of the chamber has been completed, the honing tools are moved downwardly from their inoperative positions in the guide sleeves 76 and into the cylinders to be honed.

The lower ends of the cylinders will, of course, be filled with coolant and as the tools 21 move up and down in the cylinders, a turbulent flow of coolant will be caused about the tools and through the cylinders. The top wall 29 of the chamber 10 overlying the upper ends of the cylinder acts as a baffle to deflect any coolant which is directed upwardly by the honing tools. The coolant thus stopped by the wall 29 will be drained back onto the top of the cylinder-block so as to absorb heat therefrom as it runs off of the sides of the block. As the honing operation is performed, coolant may also be supplied to the upper ends of the cylinders through the openings in the guide sleeves 76. Thus the cylinder block will be cooled about its outer surface and in the various passages formed in the block by the bath of coolant which surrounds the block, and by the coolant which is deflected by the upper wall 29. The inner surface of the cylinders will be cooled simultaneously by the circulation of the coolant up and down in the cylinders and by the coolant supplied to the upper ends of the cylinders from the chamber 75.

As soon as the honing operation has been completed, the valve 38 is opened to the drain 37 and the coolant is quickly discharged to the sump 12 through the port 35ᵃ. The gate 14 is then opened and the work is unclamped and elevated by means of the treadle 65 so that it may be moved out of the chamber onto the platform 14ᵃ. When a new piece of work has been mounted in the chamber, a new charge of coolant is admitted and the operation repeated. Before the abrasive and metal laden coolant in the sump 12 is again used, the foreign matter is removed by the filter 41 and during that time the coolant has an opportunity to dissipate the heat which has been absorbed during its use in the chamber 10.

In Figs. 6 and 7 the invention is illustrated as embodied in a different form of chamber designated as 10ᵃ of such a construction that the idle time of the machine is materially reduced, and in that alternative form of chamber two openings 13ᵃ are provided which are preferably formed in the opposite ends of the chamber and are closed by vertically slidable gates 14ᵃ. With such a construction the cylinder block 11 may be moved into the chamber 10ᵃ through one of the gates 14ᵃ and may be removed through the other gate after the honing operation.

The chamber 10ᵃ is constructed generally along the same lines as the chamber 10, previously described, and has a base section 26ᵃ forming a work support and an upper enclosing section 27ᵃ constructed to provide guides for the honing tools. As shown in Fig. 6, the base section 26ᵃ has upstanding side walls 28ᵃ, while the upper section 27ᵃ has front and rear walls 32ᵃ which are connected and braced by the top wall 29ᵃ and form continuations of the corresponding walls of the base section.

The two openings 13ᵃ in the chamber 10ᵃ are formed between the corresponding ends of the walls 32ᵃ and the gates 14ᵃ slide vertically along the edges of the walls 32ᵃ. The gates 14ᵃ are guided in their vertical movement by pairs of bars 47ᵃ secured to the walls 32ᵃ and overlying the edges of the gates so as to hold them against the ends of the walls 32ᵃ. The bars 47ᵃ extend upwardly beyond the top of the chamber 10ᵃ and are grooved at 49ª (Fig. 7) to guide the gates when they are raised to their open position and suitable counter-balancing devices are preferably provided of the same nature as that shown in Fig. 2. The gates may also be provided with suitable rollers similar to the rollers 53 for the purpose of clamping the gates firmly in position when they are closed.

The construction shown in Figs. 6 and 7 is particularly adapted for use where the so called straight line system of production is employed and the work is moved to the chamber on a platform 80 which is provided with horizontal rollers 81 substantially parallel to the gates 14ª. A similar conveyor platform 80ª is provided at the other end of the chamber 10ª over which the work may be moved away from the chamber after the honing operation has been completed.

The mechanism within the chamber 10ª for raising and lowering the work is substantially the same as that shown in Figs. 1 to 5 and is provided with bars 61ª extending parallel to the path of movement of the work and carried by similar links 62ª and operated by a foot treadle 65ª. As the work 11 is moved along the bars 61ª into the chamber 10ª, it is positioned transversely by guides 68ª located along the side walls 32ª. When the work is lowered it rests on studs 58ª and is accurately positioned by guide pins 59ª. Similar clamping devices 73ª are employed, but it will be noted that they are disposed at right angles to the position shown in Figs. 1 to 5.

The principal portion of the coolant is admitted to and discharged from the chamber 10ª through the port 35ª and during the honing operation additional coolant may be supplied from a chamber 75ª in the top wall 29ª through apertures 77ª in the guide sleeves 76ª. The excess coolant escapes from the chamber 10ª through overflow ports 42ª in the front and rear walls 32ª.

In the use of the form of chamber shown in Figs. 6 and 7, the operation is substantially the same as with the form shown in Figs. 1 to 5 except that it is possible to move a new piece of work onto the platform 80 during the honing operation. Thus, the new piece of work may be moved into the chamber 10ª as soon as the finished work has been removed therefrom onto the platform 80ª.

From the foregoing description it will be apparent that the invention provides a new and improved work enclosing chamber such that large, cumbersome work may be conveniently moved into and out of the chamber. Since the work may be moved into and out of the chamber through the side thereof,—it is possible to make the chamber unusually small so as to reduce the amount of coolant which must be forced into the chamber for each operation.

I claim as my invention:

1. A machine tool comprising, in combination, a base, a vertically movable processing tool on said base, a work support beneath said tool, bottom and side walls about said support forming a coolant chamber in which a piece of work may be submerged during a processing operation, one of said side walls being movable to permit the work to be moved sidewise into and out of said chamber, a platform outside of said chamber adjacent said movable wall upon which the work may be supported, said platform being at a higher level than said work support, means mounted on said base movable vertically to the level of said platform so that the work may be slid horizontally from said platform onto said movable means, said movable means being operable to lower the work onto said work support, and means operable as the work is so lowered to locate the work in proper horizontal position on said work support.

2. A machine of the character described comprising a bed, a column, a tool mounted on said column for vertical movement, a work support on said bed beneath said tool, means adjacent to said work support upon which the work may be positioned, said means being in a higher plane than said work support, a device mounted on said bed and movable upwardly to the level of said means so that a work piece may be slid horizontally from said means to said device, said device being operable to lower the work onto said work support, and means on said bed operable to position the work as it is lowered into place on said support.

3. In a machine tool having a working tool, walls providing a chamber in which work may be mounted to be operated upon by said tool, one of said walls being slidably mounted so that one side of said chamber may be opened, means for clamping said movable wall against certain other walls to form a liquid tight joint therebetween, and means for supplying liquid coolant to said chamber.

4. In a machine tool having a base, a column, a vertically movable processing tool mounted on said column, and a work support beneath said tool, the combination of a coolant chamber about said work support having a movable wall to permit the work to be moved horizontally into said chamber, and means for supplying coolant to said chamber to substantially submerge the work during the processing thereof.

5. A machine of the character described comprising, in combination, a work support adapted to support a cylinder block with the cylinder in substantially vertical position, means for containing and supporting a bath of liquid coolant, a honing tool reciprocable within such a cylinder and into the coolant contained therein so as to churn the coolant past the sides of the tool during the reciprocation of the tool, and a baffle wall overlying the open upper end of the cylinder to deflect the coolant which is discharged upwardly from the cylinder by the reciprocation of the tool.

6. A combination of a work support for a machine tool, and a chamber formed about said work support for containing liquid coolant in an amount sufficient to substantially submerge work mounted on said support, said chamber having an opening in one side through which the work may be moved horizontally and a closure for said opening.

7. The combination of a work support for a machine tool and a chamber formed about said work support for containing liquid coolant in an amount sufficient to substantially submerge the work mounted upon said support, said chamber having an opening in one side through which work may be moved horizontally into said chamber and an opening in another side through which work may be moved horizontally out of said chamber, and closures for said openings.

8. The combination of a work support for a machine tool and a chamber formed about said work support for containing coolant in an amount sufficient to substantially submerge the work mounted on said support, said chamber having openings in opposite sides thereof so that work may be moved into the chamber through one opening and out of the chamber through the other opening, and closures for the openings.

9. A honing machine or the like having in combination, a base, a column, a vertically movable tool mounted upon said column, a work support beneath said tool, a coolant chamber about said work support, said chamber having openings in two of its walls through which work may be moved horizontally, and means for closing said openings to retain coolant in said chamber.

10. A honing machine or the like having, in combination, a base, a column, a work support in front of said column, a vertically movable tool carried by said column above said support, and a chamber about said work support, said chamber having openings in opposite sides thereof to permit work to be moved horizontally into said chamber at one side of said column and out of said chamber at the other side of said column, and gates for closing said openings.

11. A machine of the character described comprising a bed, a column, a tool mounted on said column for vertical movement, a work support on said bed beneath said tool, means adjacent to said work support upon which the work may be positioned, said means being in a higher plane than said work support, a device mounted on said bed and movable upwardly to the level of said means so that a work piece may be slid horizontally from said means to said device, lateral guides operable roughly to position the work as it is slid horizontally onto said device, said device being operable to lower the work onto said work support and to maintain the work in engagement with said guides as it is lowered, and means on said bed operable to position the work accurately as it is lowered onto the support.

12. In a honing machine or the like having a working tool, the combination of walls providing a chamber in which work may be mounted to be operated upon by said tool, one of said walls being movably mounted so that one side of said chamber may be opened for removal or insertion of the work.

13. In a honing machine or the like having a working tool, the combination of walls providing a chamber in which work may be mounted to be operated upon by said tool, one of said walls being movably mounted so that one side of said chamber may be opened for removal or insertion of the work, a splash guard substantially closing the top of said chamber and through which said tool extends, and means for supplying liquid coolant to said chamber.

14. A machine of the character set forth comprising, in combination, a work support adapted to support the cylinder block of an internal combustion engine, a vertically reciprocable honing tool adapted for operative association with the cylinder of said block, means providing a chamber adapted to enclose the cylinder block when placed on said support, said chamber including a top wall apertured to receive said honing tool, a side wall having an opening therein to permit the cylinder block to be moved laterally into the chamber, and a closure for said opening, and means for introducing and draining liquid coolant to and from the chamber, said chamber having a volumetric capacity not substantially greater than that necessary to receive the cylinder block.

ALBERT M. JOHNSON.